United States Patent [19]

Carpanzano

[11] Patent Number: 4,511,279
[45] Date of Patent: Apr. 16, 1985

[54] CABLE TIE FOR AN AIR SUPPORTED STRUCTURE CABLE NET

[75] Inventor: Carmine Carpanzano, New Rochelle, N.Y.

[73] Assignee: Air Structures International, Tappan, N.Y.

[21] Appl. No.: 413,266

[22] Filed: Aug. 31, 1982

[51] Int. Cl.³ .............................................. F16B 1/00
[52] U.S. Cl. .................................... 403/266; 403/396
[58] Field of Search ............... 403/396, 207, 391, 265, 403/266

[56] References Cited

U.S. PATENT DOCUMENTS

| | | | |
|---|---|---|---|
| 3,591,215 | 8/1969 | Frost et al. | 403/396 |
| 3,885,360 | 5/1975 | Fraioli | 52/2 |
| 4,302,124 | 11/1981 | Wilks et al. | 403/391 |

FOREIGN PATENT DOCUMENTS 707725  4/1954  United Kingdom ................ 403/207

Primary Examiner—Andrew V. Kundrat
Attorney, Agent, or Firm—Robert E. Burns; Emmanuel J. Lobato; Bruce L. Adams

[57] ABSTRACT

A cable tie comprising a body of fused material having embedded therein a pair of crossing cable sections. The body of fused material surrounds the region of crossing of the cable sections and makes tight contact with and adheres to the cable sections for preventing relative movement therebetween. An air supported structure cable net includes a plurality of the cable ties each at a respective point of crossing of the cables comprising the air supported structure cable net.

8 Claims, 5 Drawing Figures

CABLE TIE FOR AN AIR SUPPORTED STRUCTURE CABLE NET

BACKGROUND OF THE INVENTION

The present invention relates to a cable tie for crossing intersecting cables and more particularly to a permanent cable tie for crossing intersecting cables in an air supported structure cable net.

Air supported structures are known. These structures include a sheet-like member inflatable on a surface upon which the air supported structure is to be erected. When the sheet-like member is in an inflated condition the air supported structure has a shape defined by the shape of the sheet-like member.

It is known to reinforce an air supported structure by disposing a network of cables over the structure. The cable network lies on the air supported structure and is comprised of a plurality of crossing cables which are anchored around the periphery of the air supported structure to the surface on which the air supported structure is erected. An example of an inflatable structure reinforced by a cable network is found in U.S. Pat. No. 3,885,360.

Cable networks for air supported structures are held in shape by cable clamps which clamp the cables comprising the net together at their points of crossing. It is necessary to clamp the cables together in order to maintain the shape of the cable net during inflation of the air supported structure. An example of such a cable clamp is found in U.S. Pat. No. 3,903,574.

The cable clamps presently used for air inflatable structure cable nets have various features which would be desirable to improve. First, the cable clamps have an irregular shape and are fabricated by machining them from a piece of metallic stock. The machining operation and the irregular shape of them contributes to their cost. Although the machining costs can be alleviated somewhat by using castings in the shape of the cable clamp, the cable clamps would still be relatively expensive.

Secondly, the irregular shape of the cable clamps contributes to wear of the air structure. The cable clamps rest on the air structure surface and movement of the air structure relative to the cable clamps, caused for example, by wind, causes wear in the region of the cable clamps.

Thirdly, the cable clamps are relatively difficult to install at the time a cable net is made up. The cables used with air supported structures are generally multistrand metal cables covered by a plastic sheath such as vinyl. In order to get a tight grip on the cables it is necessary to cut back the plastic sheath at the point where the cable clamp is to be attached to the cables. This operation is time consuming. Furthermore, cutting the plastic sheath allows water to enter into the cable and rust the inner metallic strands. Rust stains consequently appear on the air supported structure surface and the cables themselves deteriorate. Additionally, rusted cable surfaces against the air supported structure will chafe the material comprising the sheet-like member of the air structure.

The prior art cable clamps have also been used by connecting them directly over the plastic cable sheath instead of cutting the sheath back to allow the cable clamp to connect to the metal cable directly. This technique has been unsuccessful since the clamp over the plastic cable sheath has a tendency to grip the sheath without establishing a mechanical connection through the sheath with the metal cable strands. As a consequence, forces applied to the cable sheath by the cable clamps cause portions of the cable sheath to strip away and expose the metal cable strands.

SUMMARY OF THE INVENTION

It is therefore an object of the invention to provide an improved permanent cable tie for crossing intersecting cables suitable for use in air supported structure cable nets.

It is another object of the invention to provide an inexpensive simple to fabricate permanent cable tie for crossing intersecting cables.

It is another object of the invention to provide a cable net which includes a simple and reliable cable tie for crossing intersecting cables at the respective points of crossing of the cables comprising the cable net.

It is still another object of the invention to provide an air supported structure having a cable net comprised of a plurality of cables and permanent cable ties for the crossing intersecting cables of the cable net and which are inexpensive and simple to fabricate.

It is still another object of the invention to provide a molded permanent cable tie.

It is still another object of the invention to provide molds for an improved molded permanent cable tie.

According to the invention a pair of crossing cable sections are embedded in a permanent cable tie comprised of a body of fused material. The body of fused material surrounds the region of crossing of the cable sections and is in tight contact with and adheres to the cable sections for preventing relative movement therebetween.

The body of fused material comprising the permanent cable tie for crossing intersecting cables is a solid metallic body having a generally smooth and regular outer surface.

The crossing cable sections are each comprised of a metallic core and an outer sheath of a fusible material surrounding the metallic core. The overlapping portions of the respective outer sheaths of the crossing cable sections are fused together within the body of fused material comprising the permanent cable tie.

An air supported structure comprised of a sheet-like member dimensioned and configured to define the shape of the air supported structure has a cable network overlying the sheet-like member and constrains the sheet-like member to substantially maintain the shape of the air supported structure. The cable network is comprised of non-parallel cables that cross other non-parallel cables and permanent cable ties fastening the crossing cables at their points of crossing. The permanent cable ties for the crossing intersecting cables each comprise a body of fused material having embedded therein a pair of crossing cables at their point of crossing and making tight contact with and adhering to the crossing cables for preventing relative movement therebetween.

IN THE DRAWINGS

DETAILED DESCRIPTION OF THE INVENTION

Figure 1:
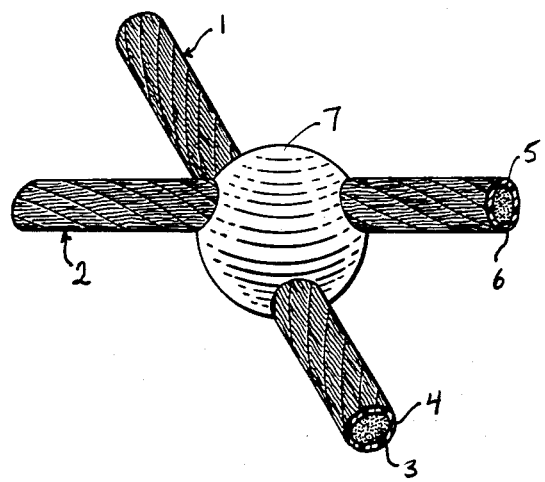
FIG. 1 is an isometric view of a pair of crossing cable sections connected with a cable tie for crossing intersecting cables according to the invention.

FIG. 1 illustrates a pair of cable sections 1, 2 connected by a cable tie 7 for crossing intersecting cables. The cable tie 7 is a solid body of fused material with the cable sections 1 and 2 embedded therein. The body of fused material comprising the cable tie 7 surrounds the region of crossing of the cable sections and makes tight contact with and adheres to the cable sections for preventing relative movement therebetween.

Figure 4:
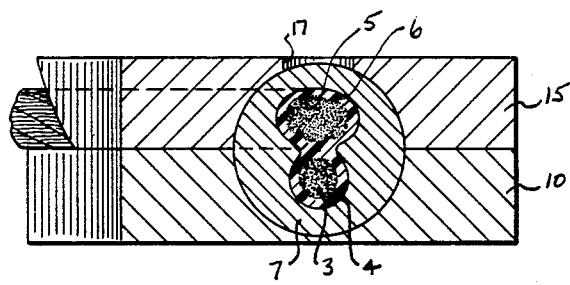
FIG. 4 is a sectional view of the mold for molding a cable tie and showing a pair of cables in section and connected by the molded cable tie for crossing intersecting cables according to the invention.

Cable section 1 is comprised of a stranded metallic core 3 covered by a sheath 4 of fusible material such as plastic. The cable section 2 is likewise comprised of a stranded metallic core 5 covered by a sheath 6 of fusible material. As shown in FIG. 4, the cable sheaths 4 and 6 are fused together in the region where the cable sections 1 and 2 cross. The body of fused material 7 comprising the cable tie for crossing intersecting cables makes tight contact with the cable sheaths and prevents the cables from moving relative to each other.

Figure 2:
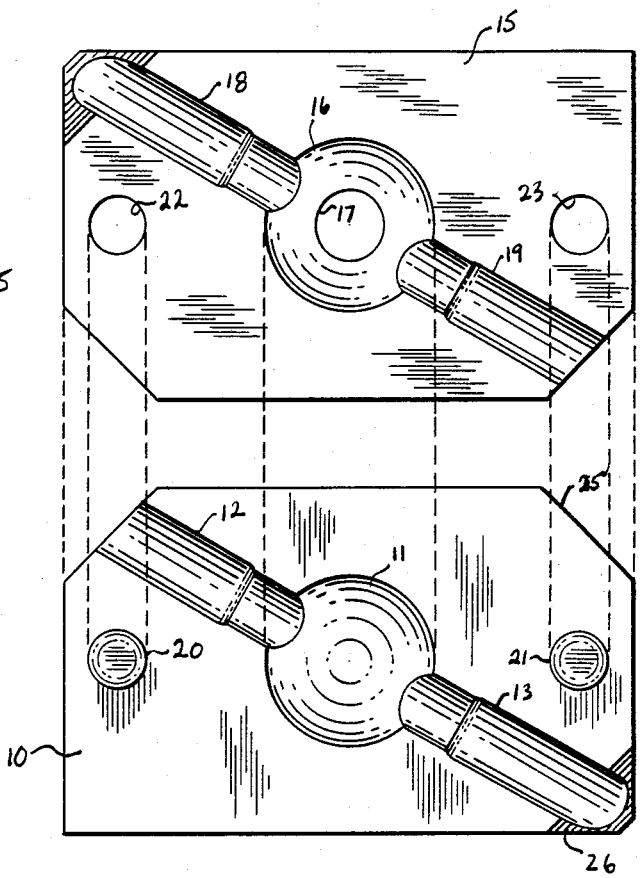
FIG. 2 is a plane view of two halves of a mold body for molding the cable tie for crossing intersecting cables according to the invention.

A mold for making the cable tie is illustrated in FIG. 2. A mold body portion 10 has a major surface having a depression 11 therein. The depression 11 defines part of a mold cavity, and an elongate surface depression 12, 13 receives, in use, a length of cable to which the cable tie is to be formed. A corresponding mold body portion 15 has a similar depression 16 for defining another part of the mold cavity. Elongate depression 18, 19 also receives, in use, a second cable to which the cable tie is to be attached.

A pair of alignment pins 20, 21 extend from the major surface of the mold body portion 10, and the alignment pins are received in openings 22, 23. The alignment pins 20 and 21, and the openings 22 and 23, are relatively positioned so that the mold body portions 10 and 15 have their respective depressions 11 and 16 in registration. Thus, the depressions 11 and 16 together jointly define a mold cavity. An opening or passage 17 provides communication through the mold body portion 15 to the depression 16 and hence the mold cavity when the mold body portions are assembled.

Figure 3:
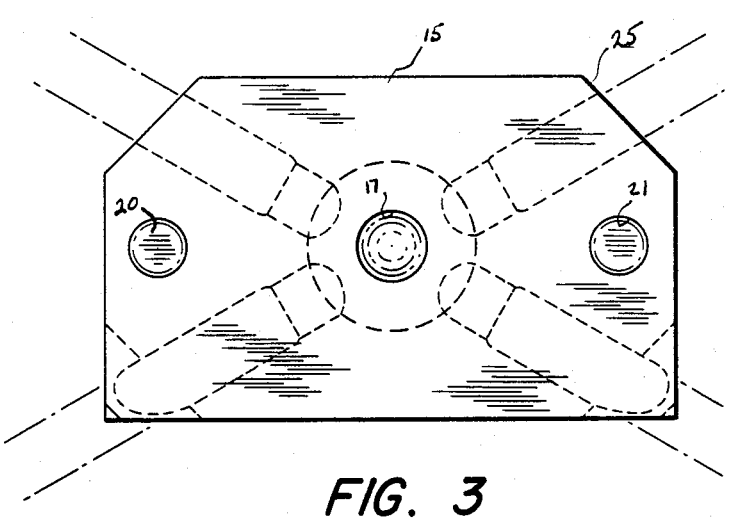
FIG. 3 is a plane view of the mold assembled and showing positions of cable sections to be connected by phantom lines.

FIG. 3 shows, in phantom, the positions of the elongate depressions 12, 13 and 18, 19 when the mold is assembled. The cables disposed in the elongate depressions define a predetermined angle therebetween, and that is the angle at which they will cross after the cable tie for the crossing intersecting cables is formed attaching them together. Depending upon the dimensions of the cable tie 7 and the material from which it is made, there may be a slight amount of flexing in the cable tie 7 after installation so that the angle between the crossing intersecting cables changes slightly.

In order to form the cable tie 7 the two mold body portions 10 and 15 are assembled with cables disposed in the respective elongate depressions 12, 13 and 18, 19. The two mold body portions are clamped together with any convenient clamp. In practice, locking pliers and lockable latches have proven to be very convenient.

Next, fusible material from which the cable tie 7 is to be made is poured, in a molten state, through the passage 17 into the mold cavity to fill the mold cavity with the molten fusible material. The fusible material is allowed to cool and solidify within the mold cavity, and then the two mold body portions 10, 15 are unclamped and the mold body portions are removed from the pair of crossing cables. The permanent cable tie 7 remains connecting the crossing cables together.

Figure 5:
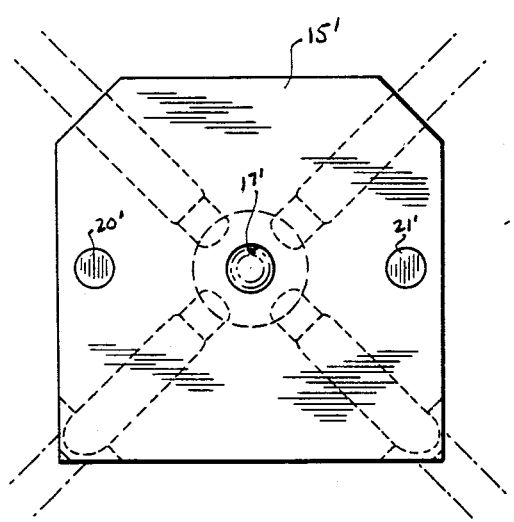
FIG. 5 is a plane view of another embodiment of the cable tie mold according to the invention.

The mold shown in FIG. 3 is configured so that the pair of crossing cables are connected by the cable tie so as to cross at some angle other than 90°. FIG. 5 illustrates a mold configured so that the crossing cables are held generally perpendicular, and the cable tie is formed attached the crossing cables so as to define an angle of 90° therebetween. The particular angles at which the cables cross are determined by the application to which they are to be put.

The mold body portions have beveled corners 25, as shown in FIGS. 2 and 3. These beveled corners assist in aligning the pair of mold body portions as the mold is being assembled. The mold body portions additionally have tapered corners 26 as shown in FIGS. 2 and 4. These tapered corners allow a tool to be inserted, such as a screw driver, to assist in prying apart the pair of mold body portions, after the fusible material comprising the cable tie for crossing intersecting cables has solidified.

An air supported structure incorporating the cable tie for crossing intersecting cables of the air structure cable network according to the invention is comprised of a sheet-like member having a shape and configuration for defining the shape of the air structure. An example of such an air supported structure is found in U.S. Pat. No. 3,885,360. A cable network overlies the sheet-like member, and the cable network is comprised of a plurality of non-parallel crossing cables which are fastened together at their points of crossing. According to the invention the cable ties are comprised of bodies 7 of fused material having embedded therein the pairs of crossing cables. In practice, lead has proven to be well suited for fabricating permanent cable ties for the crossing intersecting cables in air supported structure cable nets. Plastic and other moldable fusible materials are suitable.

In the preferred embodiment of the invention illustrated in FIG. 1, the body 7 comprising the cable tie for the crossing intersecting cables is generally spherical. This is because the mold depressions 11 and 16 which jointly define the mold cavity are generally hemispherical. However, other cable tie shapes may be used. It is important, however, that the body 7 have a generally smooth and regular outer surface when the cable tie is used to construct an air supported structure cable net. This is because the cable ties will rest on the air supported structure. Wear of the sheet-like member of the air supported structure will be minimized if the cable ties are smooth and regularly shaped. More particularly, the shape of the cable ties should be smooth with a large radius of curvature.

I claim:

1. The combination comprising: a pair of crossing cable sections; and a permanent cable tie comprising a body of fused material having embedded therein said pair of crossing cable sections, said body of fused material surrounding the region of crossing of said cable sections and making tight contact with and adhering to said cable sections for preventing relative movement therebetween, said crossing cable sections are each comprised of a metallic core and an outer sheath of a fusible material surrounding said metallic core, and wherein the overlapping portions of the respective outer sheaths of said crossing cable sections are fused together.

2. The combination according to claim 1, wherein said body of fused material is a solid metallic body.

3. The combination according to claim 1, wherein said body of fused material is a solid plastic body.

4. The combination according to claim 1, wherein said body of fused material is comprised of a moldable fused material.

5. The combination according to claim 1, wherein said body of fused material has a generally smooth and regular outer surface.

6. A cable network, comprising: a plurality of crossing non-parallel cables; and permanent cable ties fastening the crossing cables at their points of crossing, said permanent cable ties each comprising a body of fused material having embedded therein a pair of crossing cables at their point of crossing and making tight contact with and adhering to the crossing cables for preventing relative movement therebetween, said cables are each comprised of a metallic core and an outer sheath of a fusible material surrounding said metallic core, and wherein the overlapping portions of the respective outer sheaths of said crossing cable sections are fused together.

7. A cable network according to claim 6, wherein said cable ties each comprise a solid metallic body.

8. A cable network according to claim 6, wherein said bodies of fused material defining said cable ties each have a generally smooth and regular outer surface.

* * * * *